Dec. 31, 1946.     C. L. EKSERGIAN     2,413,614
BRAKE MECHANISM
Filed June 26, 1941     3 Sheets-Sheet 1
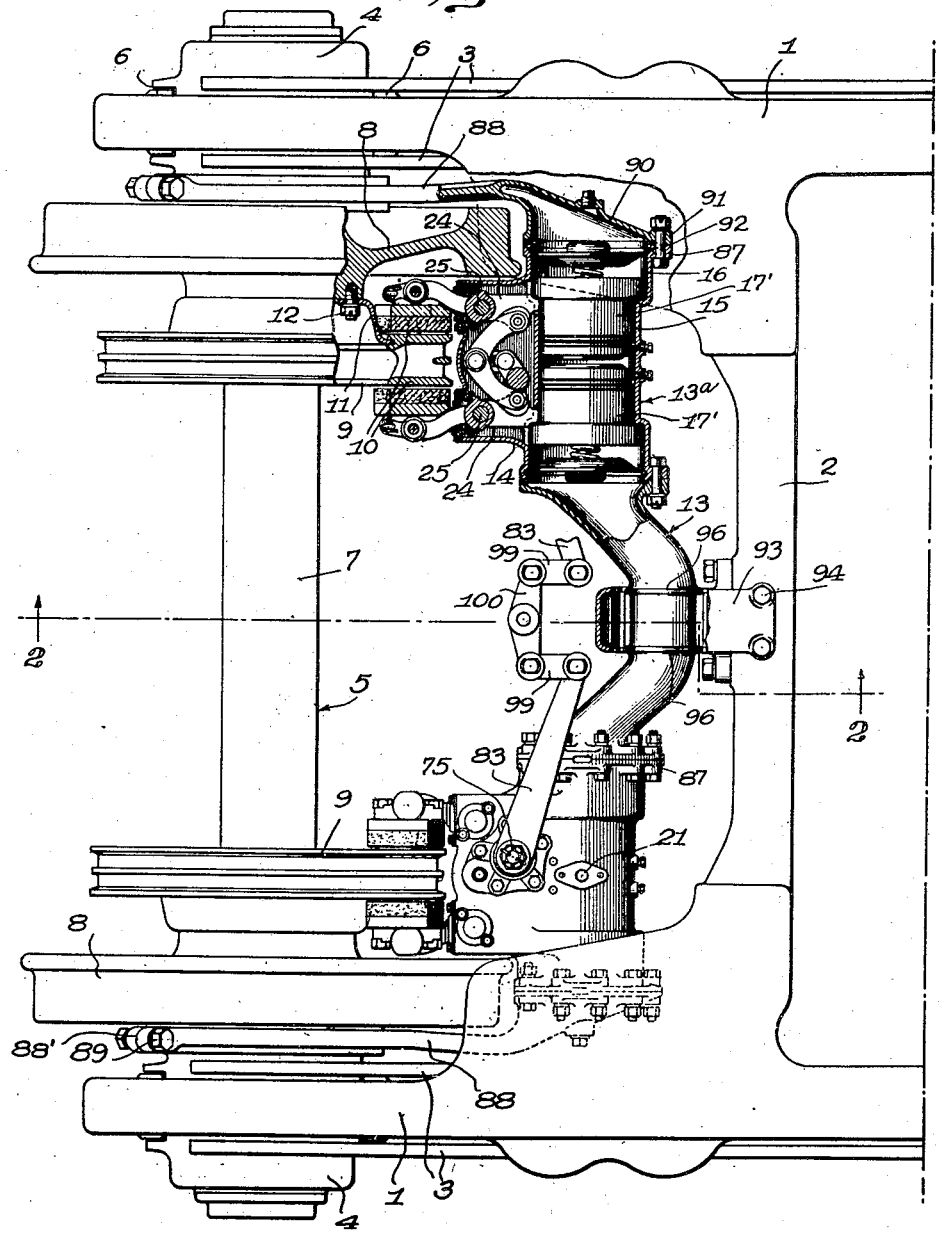
INVENTOR
Carolus L. Eksergian
BY John P. Tarbox
ATTORNEY Dec. 31, 1946.    C. L. EKSERGIAN    2,413,614
BRAKE MECHANISM
Filed June 26, 1941    3 Sheets-Sheet 2
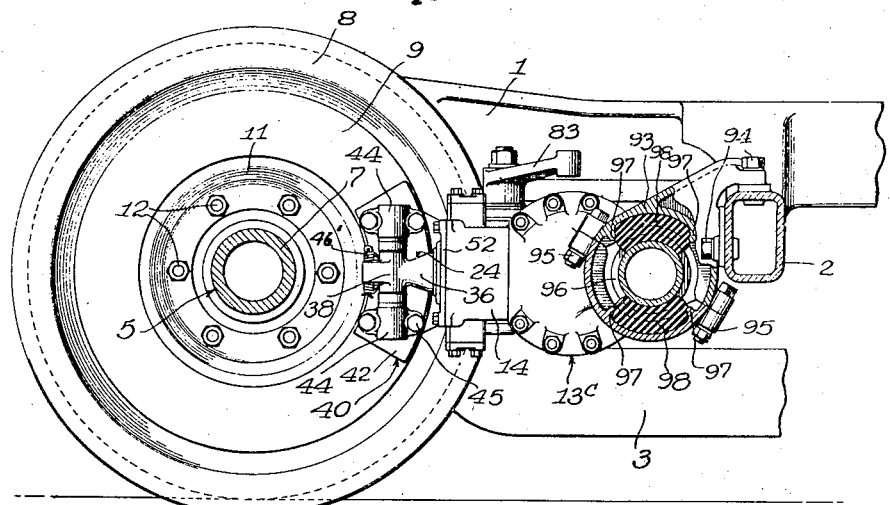
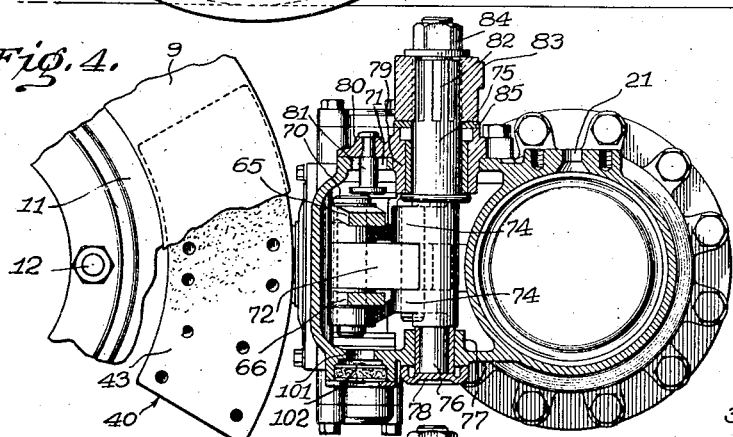
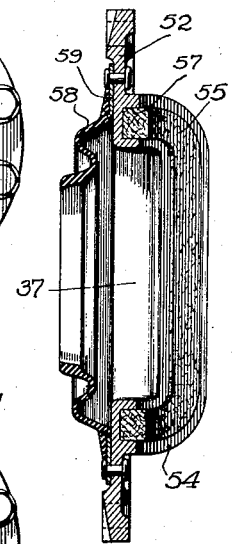
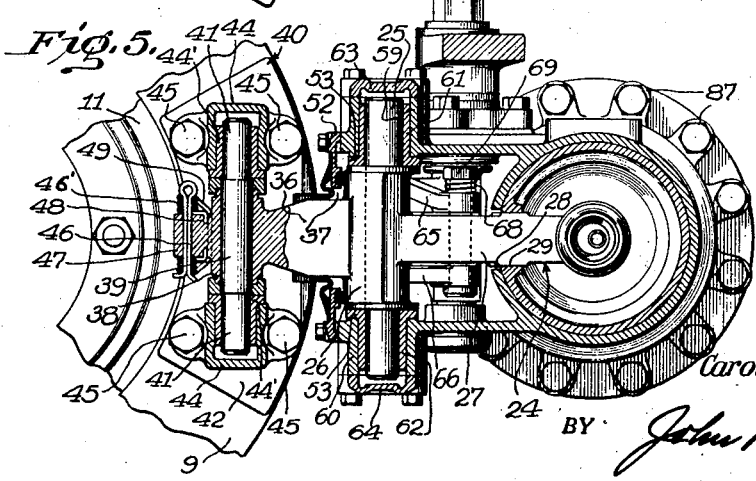
INVENTOR
Carolus L. Eksergian
BY John P. Pasbry
ATTORNEY

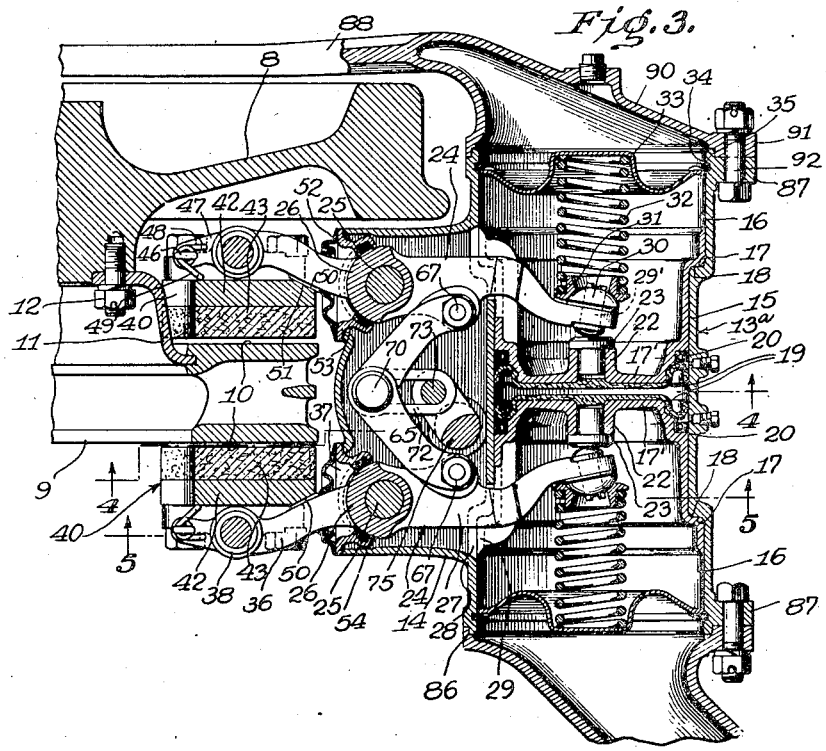

Patented Dec. 31, 1946

2,413,614

UNITED STATES PATENT OFFICE 2,413,614

BRAKE MECHANISM

Carolus L. Eksergian, Detroit, Mich., assignor to The Budd Company, Philadelphia, Pa., a corporation of Pennsylvania Application June 26, 1941, Serial No. 399,779

37 Claims. (Cl. 188—153)

The invention relates to brake mechanism and more particularly to such mechanisms adapted for use in railway trucks.

It is among the objects of the invention to simplify the construction of such brakes and the support therefor, to facilitate the manufacture and the assembly thereof, to reduce the weight and cost and generally to provide a brake mechanism of this class which is reliable in operation under all weather conditions, and in the use of which long life is assured without frequent replacements and repairs. It is a further object to provide a brake mechanism of this class which can be readily assembled in subassemblies on the bench and brought to the truck either as separate subassemblies there assembled in final assembly with each other and with the truck, or as a complete brake-support assembly connected to the truck in final assembly.

These objects are in large measure achieved by constructing the brake support for the non-rotary brake members and the actuating means therefor in separate subassemblies which, when assembled in final assembly, constitute the support a generally U-shaped or C-shaped member in plan, the ends of which and an intermediate portion have a three-point support on the truck.

The most important subassembly of the lot may comprise a unitary brake cylinder subassembly consisting of a generally T-shaped casing housing the brake cylinder and pistons and most of the supporting and actuating means for the non-rotary brake shoe members. Most of the mechanism of this unit is housed in the casing and sealed, where members extend outside the casing to prevent entrance of dirt and water. The shoes themselves may comprise a part of this unit, but means are provided for readily assembling or disassembling them as desired. This unit also may house the return springs and most of the actuating mechanism for the shoes. The casing also serves readily as a hollow tube forming part of the U- or C-shaped support and is connected at one end to the end unit of the support which has its inner end formed to fit against and be rigidly secured to the end of the cylinder unit and its outer end for securement to a lateral portion of the truck. Where two rotary brake members are employed, as shown, one associated with each wheel of a wheel and axle assembly, two cylinder units are employed, their inner ends being interconnected by a central unit having its ends formed to fit against and be secured to the cylinder units. The support assembly so formed by the end units, the adjacent cylinder units and the central unit is supported through the central unit at a third point on the truck.

Other and further objects and the manner in which they are attained will become apparent from the following detailed description when read in connection with the drawings forming a part hereof.

In the drawings:

Fig. 1 is a plan view, parts being shown in section, of an end of a railway truck showing the brake mechanism of the invention applied thereto;

Fig. 2 is a longitudinal section taken substantially on the line 2—2 of Fig. 1;

Fig. 3 is a fragmentary enlarged detail horizontal sectional view through a brake cylinder unit and associated parts;

Figs. 4 and 5 are fragmentary detail vertical sectional views taken substantially on the lines 4—4 and 5—5 of Fig. 3;

Fig. 6 is a sectional detail view on an enlarged scale of a sealing unit employed; and Fig. 7 is an exploded plan view of the multi-unit brake support of the invention.

In the drawings, the invention is shown applied to a truck including side frames 1 interconnected by transoms, as 2, and supported through springs (not shown) in a usual manner from equalizer bars 3 having their ends upwardly offset and resting on top of the axle boxes, as 4, of the wheel and axle assemblies, as 5. Each side frame is provided with the usual spaced pedestals 6 having vertically slidable engagement with the adjacent axle box. Each wheel and axle assembly may comprise an axle 7 journaled in the axle boxes 4 at the opposite sides of the truck, and wheels 8 secured to opposite ends of the axle inside the associated axle boxes.

In the present embodiment, brakes are associated with each wheel of the wheel and axle assembly. Each brake may comprise a rotary braking member 9 which may be a cast ring, as disclosed in Patent No. 2,233,594 for Brake disc, dated March 4, 1941, having opposed radial braking faces, as 10, and supported and secured to the adjacent wheel to rotate therewith by the supporting web 11 bolted, as indicated at 12 in Fig. 3, to the wheel hub. The supporting web is offset to space the braking member 9 from the adjacent wheel a distance sufficient to receive cooperating non-rotary brake parts between them.

The non-rotary brake mechanism is supported by a generally U- or C-form support designated generally by the reference numeral 13, and it is to this support and the associated parts that the invention is principally directed.

As shown in Fig. 7, the support preferably comprises two brake cylinder units 13a and 13b, a central connecting unit 13c and two end units 13d and 13e, each of which can be separately fabricated and joined to the others in final assembly.

The cylinder units comprise the most important units of the support assembly and are designed so they may be used in connection with other support units than the specific U- or C-form support shown. The two units 13a and 13b are substantially identical in construction, except that the manual-operating means, when associated with them, makes them rights and lefts, as will be seen from Fig. 7.

In these units are sealed substantially all the movable parts of the actuating mechanism of the brake, and one of them will now be described in detail.

As shown in 1, 3 and 7, each unit comprises a substantially T-form casing 14, which may be a casting and in the head of which is formed the bore of the actuating cylinder 15, the ends of this bore being shown enlarged at 16, providing shoulders at 17. The actuating pistons 17' are shown provided with wide skirts each guided by both the reduced central and the associated enlarged outer ends of the cylinder bores, and having shoulders, as 18, for engagement with the shoulders 17 to limit the inward movement of the pistons and leave the adjacent pressure faces of the piston slightly spaced apart, as shown in Fig. 3.

The pressure faces of the pistons may each be sealed by a flexible sealing cup, as 19, and lubricating rings 20 may be seated in annular recesses just inwardly of the sealing cups of the respective pistons. Fluid pressure is admitted between the pressure faces of the pistons through a port 21, Figs. 1 and 7.

The pistons may be provided centrally with an outwardly projecting hollow boss 22, within which is securely seated a headed wear-plug 23 for engagement with the associated actuating lever 24.

The pair of actuating levers 24, as shown, are made so as to be interchangeable, and are pivoted on spaced pins 25 adjacent the end of the stem of the T-form casing. Each lever has a hub portion 26 surrounding the pin 25 and preferably having a drive fit therewith so that the pin turns with the lever. From this hub extends an inner arm 27 which passes through a transversely slotted opening 28 in the adjacent cylinder wall and an aligned slot 29 in the adjacent piston skirt, as shown in Figs. 3 and 5. The end of the lever arm 27 is arranged to engage the central-headed plug 23 and may be provided with a round-headed pin 29' engaging the head of the plug 23 through the rounded head of the pin. The pin 29' projects on the opposite side of the arm 27 and has there secured to it a ball-faced seat 30 adapted to cooperate with a correspondingly faced spring guide and abutment 31 having a shoulder thereon receiving the thrust of one end of a coiled return spring 32, the opposite end of the spring bearing against a depressed central portion of an abutment plate 33 which slidingly fits the outer end of the cylinder bore and may be held against outward movement by a split elastic ring 34 received in an annular groove 35 in the cylinder wall.

Each lever 24 has an outer arm 36 extending from its hub 26 through an opening 37 in the casing, the outer end of this lever arm having an enlarged boss 38 paralleling the pivot pin 25 and adapted to receive with a driving fit a pivot pin 39 for mounting the arcuate brake shoe, designated generally by numeral 40.

The mounting of the shoe on the lever is so arranged that it can be readily removed and/or replaced, if desired. To this end the pivot pin 39 has trunnions 41 projecting above and below the boss 38, and the backing plate 42, which may comprise a block having parallel opposed faces, to the inner one of which is secured the brake lining 43, has removably secured, as by bolts 45, to its outer face, upper and lower bearing caps 44 engaging the trunnions 41 of the pin 39 through appropriate radial and thrust-bearing linings 44'.

To maintain the shoe out of contact with the rotary braking member 9 with which it is associated when the brakes are released, and to avoid rattle, resilient means are provided between the arm 36 and its associated shoe, normally holding the shoe against a stop on the arm. In the present embodiment, a resilient means is provided which is automatically tensioned in the application of a shoe to its arm and without interfering with the ready application thereof.

Such means may comprise a wire spring 46' having a number of coils wound about a cotter pin 46 above and below an extension 47 on the arm beyond the enlarged boss 38, through which extension the cotter pin extends. The ends of this spring are secured in holes 48 in extension 47, and its intermediate portion form a loop 49 having inclined sides. The loop of the spring bears against the back of the shoe at one side of its pivot and normally holds the other side of the shoe back against an abutment 50 on the arm 36. The spring is so tensioned that its looped portion 49 does not swing about cotter pin to a dead center or beyond, when the shoe is removed, so that when a shoe is again slid in position from above or below and secured in position, the inclined sides of the loop 49 engaging the edge of the shoe automatically cams back the loop and tensions the spring. As shown in Fig. 3, the shoe back is beveled at 51 where it engages abutment 50 on arm 36.

As shown in Figs. 3, 5 and 6, the opening 37 through which the arm 36 extends is sealed to prevent entrance of dirt and water, while permitting the required movement of the arm. To this end, this opening 37 is formed in a removable cover section 52 of the casing wall which closes a larger opening 53 in the casing, which opening 53 is desirable for the ready assembly of the arm with the casing.

The removable cover section 52 has an inwardly extending flanged portion 54, conforming in curvature generally to the contour of the adjacent portion of the hub 26 of the lever 24, and the joint between this flange and the hub is sealed by a sealing strip 55 seated in a channel 57 formed in the flange in opposed relation to the hub 26. To make the sealed joint additionally secure, a flexible boot 58, such as a rubber boot, has its outer margin secured as by vulcanization to a metal ring 59 which seats against the outer face of cover section 52 and is secured thereto as by riveting. The inner margin of the boot is formed with a reinforcing enlargement which tightly embraces the arm 36, see Fig. 5.

The pivot pin 25 of each of the levers 24 is housed within the casing being mounted at top and bottom in bearing sleeves 59 and 60 integral with and projecting above and below the main body of the casing, respectively. Suitable thrust and radial bearing bushings 61 and 62 are inserted between the hub 26 and the extensions of shaft 25 and the casing bearing sleeves 59 and 60, respectively. The ends of the bearing sleeves are closed by end closure caps 63 and 64 bolted to the casing.

Thus it will be seen that the bearings for the arms are entirely sealed within the housing and protected from the entrance of dirt and water.

The brake cylinder unit so far described is complete for fluid pressure operation, but since it usually is desirable to have an emergency manual control of the brakes in the event of failure of the fluid pressure control, there is associated with each of the brake cylinder units 13a and 13b, means for operating the brakes manually independently of the fluid pressure operation.

To this end, upper and lower pairs of toggle links 65 and 66 are pivoted above and below the arms 27 of the opposed levers 24 by pivot pins 67 headed at one end and provided with an anti-rattle spring, as 68, between a nut 69 on the other end and the parts connected by the pins 67. The toggle links 65 and 66 are connected together by a headed pin 70 which is assembled therewith through an opening 71 formed in the top of the casing 14.

A slotted link 72 is inserted at one end between the upper and lower toggles 65 and 66, with the pin 70 passing through the slot of the link. The other end of the slot in this link 70 engages a pin 73 and is located between two spaced crank arms, as 74, through which the pin 73 passes and which are integral with a vertical actuator shaft 75. This shaft has its reduced lower end 76, see Fig. 4, mounted in a bearing 77 on the casing closed by a cap 78 similar to the closure caps 63 and 64. The bearing 79 for the upper enlarged portion of the shaft is provided on a separate closure plate 80 closing the opening in the top of the casing through which the shaft is assembled with casing, and at the same time closing the opening 71. To avoid vertical shifting of the toggle pin 70, a headed abutment 81 is provided on the closure plate 80.

The upper enlarged part of the shaft 75 projects above its upper bearing in the casing and is there provided with a splined portion 82 to which may be secured in various desired angular relations an arm 83 held in place by a nut 84. A suitable bearing washer 85 is inserted between the arm and the bearing plate 80.

The slotted link 72 provides a lost motion connection which permits the operation of the levers by fluid pressure admitted between the pistons without affecting the manual actuator shaft 75.

The ends of the cylinder portion or the ends of the head of the T-form casing of the cylinder unit are each formed with angular-section margins, as 86, which have at spaced intervals radial lugs 87, the margins and lugs forming joint structures for securing the unit to adjacent units.

Each end unit, 13d and 13e, comprises a longitudinally extending arm 88 having approximately half of a two-part bearing formed thereon, the other half 88' being bolted thereto at its opposite ends, as shown, for example, at 89 in Fig. 1. This bearing is supported, in the embodiment shown, upon the adjacent axle box 4 substantially concentric with the axle similar to the support shown in Patent No. 2,236,898, granted April 1, 1941. Just beyond the adjacent wheel, each end unit is formed with a flaring end portion 90, the margin of which, as shown in Fig. 3, is of angular section to nest with the angular-section margin 86 of the cylinder unit and having spaced radial lugs 91 abutting the radial lugs 87 on the cylinder units. Bolts 92 passing through openings in these abutting lugs rigidly secure the end units to the outer ends of the cylinder units.

The inner ends of the cylinder units are formed with final assembly joint formations generally similar to their outer ends and the intermediate tubular unit 13c has similar end conformations to the end units and is similarly joined at its opposite ends to the inner ends of the respective cylinder units, as shown in Figs. 1 and 3.

The intermediate unit 13c has its central portion offset toward and extending substantially parallel to the adjacent transom 2 of the truck frame and is preferably flexibly connected thereto to permit slight relative lateral or endwise movement of the truck frame without straining the U- or C-form brake support.

In the form shown, this connection may comprise (see Figs. 1 and 2) a two-part casing 93 engaging the top and a side of the transom 2 and rigidly bolted thereto by the bolts 94. This casing comprises two generally semi-circular bearing members of channel cross-section loosely surrounding the central portion of the unit 13c and bolted together by bolts 95. In substantially the planes of the side walls of this bearing, the member 13c is formed with outwardly projecting ribs, as 96. The channel-section bearing, at top and bottom, is formed with spaced ribs, as 97, forming with the side walls of the channels upper and lower pockets in which are seated segmental rubber blocks, as 98. These blocks are laterally confined by the side walls of the channel-section bearing and the ribs 96 on the member 13c, and circumferentially by the ribs 97. The rubber blocks are preferably placed under some compression in the assembly of the parts, and act under compression to take the vertical shocks and the torque reaction, but act mainly in shear, without imposing strong restraint, to relative lateral and longitudinal movement between the truck frame and the brake support.

It will be understood that the arms 83 for the manual operation extend from the opposed cylinder units toward the center of the truck, as shown in Fig. 1, and are there connected by links 99 to an equalizer bar 100, to the center of which the usual brake rod or cable, not shown, is connected. Thus the brakes will be equalized for the opposite wheels manually as well as under fluid actuation, assuming that both cylinders are connected to a common fluid pressure supply.

The operation of the brakes will now be briefly described.

When fluid under pressure is applied through ports 21 to the space between the pistons 17 in cylinders 15, the pistons move outwardly compressing the springs 32, which are relatively soft, and rocking the actuating levers about their pivots 25, to move the shoes 40 against the opposite faces 10 of the associated brake member 9, thus applying the brake in accordance with the degree of fluid pressure applied to the cylinders. In this actuation, the casing in which the levers and cylinders are mounted is maintained sealed at all times. Also, the pins 70 slide in the slots in links 72 and do not affect the manual actuation. Upon exhaust of the fluid pressure from between the pistons, the springs 32 return the pistons 17 and actuating levers 24 to inoperative position shown in Fig. 3. In this position, the shoes 40 are held by the springs 46' against the abutments 50 on the arms 36 of the levers, where they are kept out of contact with the rotary brake member.

In the manual application, a pull on the equalizer bar 10 moves the lever arms 83 to rotate the shafts 75 in opposite directions. Since the shafts are arranged on each cylinder unit toward the central axis of the truck, and their crank arms connected to the toggles project outwardly away from the truck axis, such rotation in each instance pulls on the links 72 to straighten the toggles 65 and 66, which swings the levers 24 about their pivots against the tension of the return springs 32 to apply the brakes. The pistons remain idle in this manual actuation. Upon release of the pull on the equalizer bar 100, the springs 32 again return the parts to inoperative position. Since the casing housing the cylinders and most of the actuating mechanism is sealed, to avoid the possibility of back pressure of the air in the casing behind the pistons 17, there may be provided a breather opening 101 in the bottom of the casing 14 (see Fig. 4), and this opening may be provided with a filter 102 for cleaning the air which may be sucked into the casing by the return of the pistons.

In the foregoing description, a preferred embodiment has been described. It will be understood that changes and modifications may be made from the precise details, and any such changes and modifications as would occur to those skilled in this art are intended to be included in the scope of the claims hereto appended.

What is claimed is:

1. In a brake mechanism, a brake cylinder and shoe unit adapted to be assembled as a unit in a brake support and forming a brake-load-carrying part thereof, said unit comprising a casing, a cylinder bore formed therein, a pair of pistons slidable in said bore and means for applying fluid pressure between them to force them apart, a pair of levers pivoted in the casing and each having arms projecting, respectively, one into the cylinder bore for engagement with a piston and the other beyond the casing, said last-named arms carrying brake shoes, and resilient means in the casing for returning the levers to inoperative position.

2. A brake mechanism according to claim 1, in which manually actuated means is associated with the unit and connected to the levers by a lost-motion connection.

3. A brake mechanism according to claim 1, in which manually actuated means is associated with the unit and comprises a vertical shaft mounted in the casing between the lever arms extending into the cylinder bore, said shaft being connected to make and break a toggle connected to said arms.

4. In a brake mechanism, a brake cylinder and shoe unit adapted to be assembled as a unit in a brake support, said unit comprising a casing of generally T-shape having a cylinder bore in the head of the T and a piston slidable in said bore, and means for admitting fluid pressure to one face of the piston to actuate it, a lever pivoted in the stem of the T and having one arm projecting into the bore for engagement with the opposite face of the piston and another arm projecting through an opening in the outer wall of the casing and carrying a brake shoe, a return spring for the lever located in the casing, and a seal between the lever arm and the opening in the outer wall of the casing.

5. In a brake mechanism, a brake cylinder and shoe unit adapted to be assembled as a unit in a brake support, said unit comprising a casing of generally T-shape having a cylinder bore in the head of the T closed at its opposite ends by removable closures, a pair of pistons slidable in said bore, and means for admitting fluid under pressure between their adjacent faces to force them apart, a pair of levers pivoted in the stem of the T and having arms extending into the bore for engagement, respectively, with the remote faces of the pistons, spring means in the bore arranged between said arms and the adjacent removable closures for returning the arms and pistons, said levers also having arms extending through openings in the casing wall to the outside of the casing, each carrying a brake shoe, and sealing means between said arms and the casing.

6. A brake mechanism according to claim 1, in which a toggle connects two arms of the levers, and a manually actuated shaft is mounted in the casing and connected to the toggle for operating the levers independently of the fluid-actuated pistons.

7. A brake mechanism according to claim 1, in which a toggle is connected between the corresponding arms of the levers and a manually actuated shaft is connected to the toggle by a lost-motion connection, whereby the levers may be operated by the fluid-actuated pistons without moving the manually operated shaft.

8. In a brake mechanism, a disc brake member, a brake shoe for cooperation therewith, a support for said shoe comprising an actuating lever pivotally connected to the back of the shoe, said connection comprising a pivot having trunnions projecting from the opposite sides of the lever, and bearings engaging said trunnions and removably secured to the back of the shoe, said bearings, when one is released from securement to the back of the shoe, being slidable endwise of the trunnions to release the shoe from the lever.

9. In a brake mechanism, a brake cylinder and shoe unit capable of assembly as a unit with a brake support, said unit comprising a casing having a cylinder bore therein guiding an actuating piston, an actuating lever having a hub portion pivoted in said casing and having one arm extended into cooperative relation to said piston and another arm extended through an opening in the casing wall to the outside thereof and carrying a brake shoe, the opening in the casing being formed in a removable section having a bearing face conforming to the adjacent hub portion of said lever, a groove in said bearing face, and packing in said groove.

10. A brake mechanism according to claim 9, in which said removable section has secured to it one end of a flexible boot surrounding the opening therein, the other end of said boot being secured to the arm of the lever outwardly of the opening.

11. In a brake mechanism for trucks having a frame and a wheel and axle assembly supporting said frame, an annular rotary braking member associated with each wheel of said assembly to rotate therewith, a pair of brake cylinder units, one associated with each of said rotary members, said units each comprising a casing including a brake cylinder, pistons movable in said cylinder and actuating levers, the major portion of the actuating levers being mounted within the casing and having one of their ends cooperating with the respective pistons, their other ends projecting outside the casing and carrying brake shoes for cooperation with the opposite faces of the associated rotary member, and means for securing said units to a support structure supported at spaced points on the wheel and axle assembly and at a third point on the truck frame.

12. In a brake mechanism for trucks having a frame supported on a wheel and axle assembly and having a transverse member spaced longitudinally of said wheel and axle assembly, a brake support of generally U-form in plan supported at its ends to rotate substantially about the axis of the axle of said assembly and having a central offset portion generally paralleling the transverse member of the frame, a bearing housing surrounding the said offset portion and secured to the transverse frame member, and cushioning means between said bearing housing and said offset portion.

13. A brake mechanism according to claim 12, in which the cushioning means comprises arcuate rubber cushions arranged above and below the offset portion.

14. A brake mechanism according to claim 12, in which the cushioning means comprises upper and lower rubber cushions, and pockets are provided on the casing to confine the rubber cushions circumferentially and laterally, and annular shoulders are provided on the offset portion to confine the rubber cushions laterally.

15. In a brake mechanism for trucks having side frame members supported by a wheel and axle assembly and a transverse member supported by said side frame members, a pair of rotary disc brake members, one secured to rotate with each wheel of said wheel and axle assembly, a pair of brake cylinder unit subassemblies for cooperation with each of said rotary brake members, each said sub-assemblies including a casing embodying a brake cylinder, a pair of pistons movable in the cylinder and levers pivoted in the casing and actuated, respectively, by said pistons, said levers carrying brake shoes in position for cooperation with the adjacent rotary brake member, a brake support including said brake cylinder subassemblies, end subassemblies secured to the laterally outer ends thereof and supported from the side portions of the truck, and a central subassembly secured to the inner ends of the brake cylinder subassemblies and in turn supported by the transverse member of the truck.

16. In a brake mechanism, a unitary subassembly comprising an actuating cylinder and a piston therein, a brake member supported by said subassembly, a lever connection between the piston and brake member, a spring for returning said piston and lever, the lever being mounted in a housing secured to the cylinder and extending through an opening in the housing wall permitting the necessary movement of the lever, the space between the lever and the margin of the opening being sealed by a flexible seal.

17. In a brake mechanism, a unitary subassembly comprising an actuating cylinder closed at both ends, and a piston therein, a brake member, and a lever operatively connecting said brake member and piston, the lever being mounted in a housing secured to the cylinder and extending through an opening in the wall thereof, said opening being sealed by means permitting the necessary movement of the lever.

18. In a brake mechanism, a disc brake member, a brake shoe for cooperation therewith, a support for said shoe comprising an actuating lever pivotally connected to the back of the shoe, an abutment on said lever on one side of said pivotal connection and spring means between said lever and shoe on the other side of said pivotal connection, said spring means being secured to one of said lever and shoe and having an abutting engagement with the other and being so disposed and arranged as to be automatically tensioned in the application of the shoe to the lever.

19. In a brake mechanism, a disc brake member, a brake shoe for cooperation therewith, a support for said shoe comprising an actuating lever pivotally connected to the back of the shoe, an abutment on said lever on one side of said pivotal connection and a coil spring between the lever and shoe urging the shoe against said abutment, one end of said spring being secured to one of said shoe and lever, and the other end engaging the other of said shoe and lever, the parts being so disposed and arranged that the spring is tensioned by a cam action in the application of the shoe to the support.

20. In a brake mechanism, a brake cylinder and shoe unit adapted to be assembled as a unit in a brake support, said unit comprising a casing having portions extending at right angles to each other, a cylinder bore in one of said portions and a piston slidable in said bore, and means for admitting fluid pressure to one face of the piston to actuate it, a lever pivoted in the other portion of the casing and having one arm projecting into the bore for engagement with the opposite face of the piston and another arm projecting through an opening in the outer wall of the casing and carrying a brake shoe, a return spring in the casing engaging said lever for returning the piston and lever and a seal between the lever arm and the opening in the outer wall of the casing.

21. In a brake mechanism, a brake cylinder and shoe unit adapted for assembly as a unit with a brake support, said unit comprising a closed casing having a cylinder bore therein guiding an actuating piston, an actuating lever having a hub portion rotatably mounted within the casing and having one arm extended into cooperative relation to said piston and another arm extended through an opening in the casing to the outside thereof and adapted to carry a brake shoe, and sealing means between said hub portion of the actuating lever and the opening in the casing.

22. In a brake mechanism, a closed casing adapted to form a rigid part of a brake support, said casing comprising a fluid pressure cylinder and a lever supporting housing, a piston slidably mounted in said cylinder, a brake lever pivoted in said housing, enclosed in large part thereby and having a part thereof extending through an opening in the casing for operative connection with a brake shoe and another part extending within the casing into the cylinder for operative connection with said piston, and means for sealing the opening through which the lever extends.

23. In a brake mechanism, a brake support comprising a closed casing, a brake cylinder actuator therein, a brake-actuating lever pivotally mounted in the casing and passing through an opening in a wall thereof, one part of said lever extending outside the casing for operative connection with a brake shoe, and another part extending within the casing for operative connection with said actuator cylinder, and means for sealing the opening through which the lever passses.

24. In a brake mechanism, a brake support comprising a closed casing, a brake-actuating lever having a pivot portion mounted in spaced bearings in opposite walls of said casing and having arms extending from said pivot portion, one outside the casing and one inside the casing, the casing having a main body portion carrying one of said spaced bearings and having an opening in the wall opposite said bearing, and a removable cover for said opening carrying the other bearing.

25. In a brake arrangement, a vehicle frame, a supporting wheel and axle assembly comprising an axle with wheels thereon, journal boxes associated with the ends of said assembly, a brake disc secured to each wheel, and brake means for each disc comprising a cylinder housing supported from the adjacent box, brake levers fulcrumed in said housing at opposite sides of the disc, friction means on said levers for engagement with said disc, a cylindrical member extending between the housings associated with respective discs, and a resilient support from said frame for said members, said support comprising cylindrical resilient means compressed around said member and resisting in compression vertical and longitudinal movement of the member and resisting in shear transverse movement thereof.

26. In a brake arrangement, a vehicle frame, a supporting wheel and axle assembly comprising an axle with wheels thereon, journal boxes associated with the ends of said assembly, a brake disc secured to each wheel, and brake means for each disc comprising a cylinder housing supported from the adjacent box, brake levers fulcrumed in said housing at opposite sides of the disc, friction means on said levers for engagement with said disc, a removable torque tube connecting the housings adjacent opposite ends of the assembly, substantially cylindrical means secured to said vehicle frame around said tube, and resilient means compressed between said cylindrical means and said tube.

27. A brake mechanism comprising a wheel and axle assembly, a brake disc secured thereto, brake shoes in cooperative relation with the opposite faces of said disc, a yoke support for said shoes comprising a transverse cylindrical member extending beyond the wheels and supported from the ends of said assembly, a vehicle frame supported from said assembly, and means connecting said yoke support to said vehicle frame, said means comprising cylindrical resilient means disposed around said member for resisting in shear transverse movement of the yoke support with respect to the vehicle frame and resisting in compression all other movement of the yoke support with respect thereto.

28. In a brake arrangement, a vehicle frame, a supporting wheel and axle assembly, brake discs secured thereto adjacent opposite ends thereof, a cylinder housing adjacent each disc, friction means supported from said housing for engagement with said disc, means supporting each housing from the associated end of said assembly, removable means connecting said housings, and a resilient connection between said removable means and said frame, said connection comprising resilient means disposed around said removable means.

29. In a brake arrangement, a vehicle frame, a supporting wheel and axle assembly, a brake rotor driven thereby, brake means associated with said rotor, a support yoke for said brake means, said yoke comprising a cylindrical member extending transversely of the frame and a member extending longitudinally thereof and supported from said assembly, and cylindrical resilient means mounted on said frame and clamped around the first-mentioned member.

30. In a brake arrangement, a vehicle frame, a supporting wheel and axle assembly comprising an axle with wheels thereon, a brake disc mounted to rotate with each wheel, friction means associated with each disc, and a support for said friction means comprising a substantially C-shaped yoke member having a cylindrical portion extending transversely of the frame and portions extending longitudinally thereof and supported from said assembly, substantially cylindrical means secured to said vehicle frame around said cylindrical portion, and resilient means compressed between said cylindrical means and said cylindrical portion.

31. In a brake arrangement, a vehicle frame, a supporting wheel and axle assembly, brake discs mounted thereon, brake shoes adapted for engagement with opposite sides of each disc, and support means for said shoes comprising a yoke extending transversely of the frame and supported at its ends from the ends of said assembly, seat portions adjacent opposite ends of said yoke, cylinder housings removably seated thereon, means securing said housings in position upon respective seat portions, and brake levers fulcrumed in each housing and operatively connected to the associated shoes.

32. In a brake arrangement, a vehicle frame, a supporting wheel and axle assembly, brake discs mounted thereon, brake shoes adapted for engagement with opposite sides of each disc, and support means for said shoes comprising a yoke extending transversely of the frame and supported at its ends from the ends of said assembly, seat portions adjacent opposite ends of said yoke, cylinder housings removably seated thereon, means securing said housings in position upon respective seat portions, brake levers fulcrumed in each housing for support of respective shoes, and means connecting said yoke to said frame.

33. In a brake arrangement, a wheel and axle assembly, rotatable brake members mounted thereon, friction means for engagement with said members, a brake frame supported from the ends of said assembly outwardly of the wheels, means preventing rotation of said brake frame, and removable means on said brake frame affording support for said friction means, said removable means comprising cylinder housings removably secured to the brake frame adjacent respective rotatable members, and brake levers fulcrumed in each housing and engaged with the associated friction means.

34. A brake mechanism for a vehicle comprising a wheel and axle assembly, a brake disc carried by said assembly, brake shoes adapted for engagement with opposite sides of said disc, and support means for said shoes comprising a brake frame and cylinder housing assembly having a portion thereof extending transversely of the vehicle adjacent the periphery of said disc, supported through its ends at laterally spaced points on the vehicle and having a cylinder housing removably associated therewith, and brake levers fulcrumed in said housing and operatively connected to the respective shoes.

35. In a railway car truck comprising a frame member and a supporting wheel and axle assembly including an axle and a member rotatable therewith, spaced friction means for engagement with said rotatable member, a brake frame supported adjacent said assembly, brake levers pivotally fulcrumed from said brake frame and connected to respective friction means, links forming a toggle connection between said brake levers, an actuating lever fulcrumed from said brake frame and having means for engagement with said links at the pivot of said toggle, and means for actuating said actuating lever.

36. In a railway car truck, a frame member, a supporting wheel and axle assembly, a rotor mounted thereon, spaced friction means for engagement with said rotor; a brake frame, means supporting said brake frame adjacent said assembly, said support means including a torque connection between said brake frame and said member, brake levers pivotally fulcrumed from said brake frame and connected to respective friction means, links forming a toggle connection between said brake levers, an actuating lever fulcrumed from said brake frame and having means for engagement with said links at the pivot of said toggle, means for actuating said actuating lever, and actuating means independent of said actuating lever and operatively connected to said brake levers.

37. A brake mechanism for a vehicle comprising a wheel and axle assembly, brake discs carried thereby one adjacent each end thereof, brake shoes adapted for engagement with the opposite sides of the respective discs, and support means for said shoes comprising a transversely extending member carried at its ends by longitudinally extending arms each having an oscillatable connection with said wheel and axle assembly, the transversely extending member embodying cylinder housings rigidly but removably secured thereto and each housing disposed in large part within the vertical projection of said transversely extending member in the region adjacent the vertical plane of an associated disc, and brake levers fulcrumed in each housing for the support of the respective shoes.

CAROLUS L. EKSERGIAN.